July 25, 1950  R. F. ADKISSON  2,516,742
BALE REGULATOR

Filed Aug. 21, 1948  4 Sheets-Sheet 1

Robert F. Adkisson
INVENTOR,

BY
Bernard P. Miller
ATTORNEY

July 25, 1950  R. F. ADKISSON  2,516,742
BALE REGULATOR
Filed Aug. 21, 1948  4 Sheets-Sheet 2

Robert F. Adkisson
INVENTOR,

BY
Bernard P. Miller
ATTORNEY

July 25, 1950  R. F. ADKISSON  2,516,742
BALE REGULATOR

Filed Aug. 21, 1948  4 Sheets-Sheet 4

Robert F. Adkisson
INVENTOR,

BY
Bernard P. Miller
ATTORNEY

Patented July 25, 1950

2,516,742

UNITED STATES PATENT OFFICE 2,516,742

BALE REGULATOR

Robert F. Adkisson, Verden, Okla.

Application August 21, 1948, Serial No. 45,452

3 Claims. (Cl. 100—20)

The present invention relates to hay balers, and more particularly to balers of the self-tying type, wherein the bales are automatically tied when a predetermined amount of hay has been compressed within the bale-box.

The principal objects of the invention, is to provide selectively adjustable mechanism for controlling operation of the bale tying apparatus.

One object of the invention is to provide a selectively adjustable mechanism which, when once set, will thereafter work automatically.

Another object is to provide a mechanism for this purpose, which may be easily and quickly adjusted to produce given length bales after each setting.

A further object is to provide an adjustable mechanism for the purposes set forth, such mechanism being so designed that it may be operatively installed upon balers, without remodification of the present bale tying apparatus.

An additional object is to provide a mechanism which is simple in construction, easy to install, and which has few moving parts to become worn or to get out of order.

In those of the present day balers which are equipped with automatic bale tying mechanism which is actuated by movement of hay compressed in the bale-box, the weight of the bales is governed by an adjustable means in the bale-box for partially choking the bale-box exit. This choking mechanism acts to control the tightness with which the hay is compressed in the bale-box, and its adjustment consequently regulates the tightness of the tied bale.

With the mechanism of the present invention installed upon one of such balers, the conventional bale-box choking mechanism may be permanently set to insure a tight compression of hay in the bale-box. Thereafter, the bales come out in substantially even lengths, and all are tightly compressed. When lighter weight bales are desired, the control mechanism is regulated to make a shorter bale.

When the conventional bale-box choking apparatus is used, as above described, a lighter weight bale is always a more loosely compressed bale. With the present invention in operation, a lighter weight bale is as firmly compressed as the heavier bale, the only difference being that the lighter weight bale is shorter.

It is therefore an important object of the present invention to provide a mechanism whereby the weight of the bale is varied only by a change in its length, and not by a difference in compression.

With present day automatic bale tying mechanism installed in the conventional baler, and controlled in the conventional manner, the bales produced often vary in length as much as six inches. Such length variation is not desirable, but is caused by a carry-over of compressed hay. The hay which may inadvertently fail to get into one bale is added to the next bale. This is caused by the fact that the usual metering wheel is not declutched during each bale tying operation. With the mechanism of the present invention installed, the conventional metering wheel is prevented from starting metering of the following bale until after the tying operation is completed.

Other objects will be apparent from the following description when taken in conjunction with the accompanying four sheets of drawings, wherein.

Like characters of reference designate like parts in those figures of the drawings in which they occur.

Figure 1:
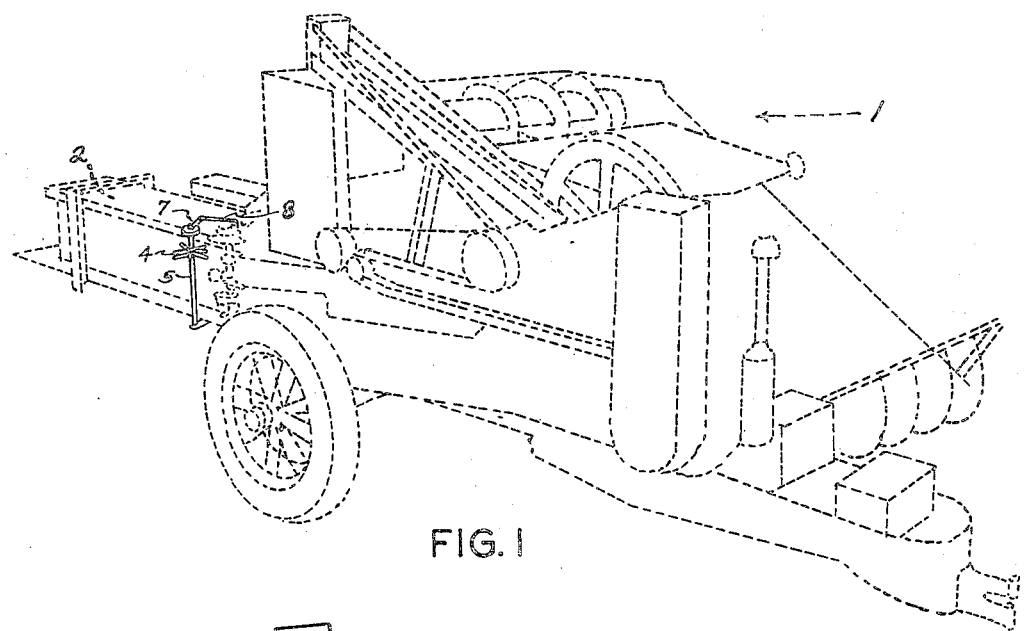
Figure 1 is a broken line perspective view of a conventional hay baler, with conventional tripping mechanism being shown, schematically in solid lines, operatively installed thereon.

The drawings herein illustrate the mechanism of the present invention as it appears when installed in conjunction with a hay baler now on the market nationally, and being manufactured by the New Holland Machine Company of New Holland, Pennsylvania. The baler depicted is known nationally as the "No. 75, New Holland Automaton," and is illustrated and described in printed "Bulletin No. 645," which is published and distributed by the New Holland Machine Company.

In the drawings:

The reference numeral 1 indicates, as a whole, a conventional hay baler which includes a hollow rectangular bale-box 2 within which the hay is compressed, and also includes an automatically operated bale tying apparatus, which is mounted on the bale-box 2, and which is indicated as a whole by the reference numeral 3, (Fig. 1). Operation of the bale tying mechanism is controlled by a star-gear or metering wheel 4 which is mounted rigidly on a vertical shaft 5, which in turn is rotatably journalled in bearing brackets 6 at one side of the bale-box 2. The bale-box 2 has a longitudinally extending horizontal slot through which the fingers of the metering wheel 4 project in order to contact the pressed hay as it travels rearwardly in the balebox. The arrangement is such that when the metering wheel is rotated through approximately one complete revolution, the bale tying apparatus is released for operation, and such operation actuates an arm 7 keyed to the upper end of the shaft 5, through co-operation of a link 8, (Fig. 1). The mechanism of the present invention is designed to operate in lieu of conventional mechanism for tripping automatic bale tying apparatus, and operates in conjunction with the shaft 5. In carrying out the present invention, the shaft 5 is further equipped with a pivoted arm 9 which is adapted to contact a lug 10 on a square shaft 11 during rotation of the shaft 5 which is being driven by the metering wheel 4. The shaft 11 is actually a trigger, which releases the tying mechanism 3 to one complete operational cycle, when the lug 10 is moved by the arm 9.

Except for the arcuate tripping arm 9, the elements above described and indicated by the reference numerals 1 to 11 inclusive are conventional, and are not individual to the present invention. However, the present invention utilizes the metering wheel 4, the vertical shaft 5, the arm 9, and the link 8. It is pointed out that in the conventional mechanism shown in Fig. 1, the link 8 is utilized to return the shaft 5 to its original radial position each time the bale tying apparatus 2 is placed in operation, and then returns to its own original position. The link 8, by actuating the arm 7 not only returns the shaft 5 to its original position, but in so doing, the arcuate arm 9 is also returned to its original position. In the conventional mechanism, when the arm 9 is returned to its original position, it then has a given distance to travel before it may again contact the lug 10, and may thereby operate the trigger shaft 11 to again release the tying apparatus 3 to another operational cycle.

In carrying out the present invention, mechanism is provided for adjustably controlling the distance which the arcuate arm 9 must travel, before reaching the lug 10. In other words, the mechanism of the present invention adjustably controls the distance at which the arm 9 is re-set from the lug 10, at the completion of each operational cycle of the bale tying apparatus 3.

Since the link 8 is a part of the conventional bale tying apparatus, its length of stroke is fixed. The present invention makes it possible to utilize the fixed stroke of the link 8, so as to re-set the cam arm 9 different portions of one complete revolution from the lug 10, each time the tying apparatus 3 returns to its original or at rest position, after completing its own operational cycle.

The following described mechanism and arrangement of parts are utilized as the means for adjustably re-setting the arcuate arm 9 different distances from the lug 10.

Figure 4:
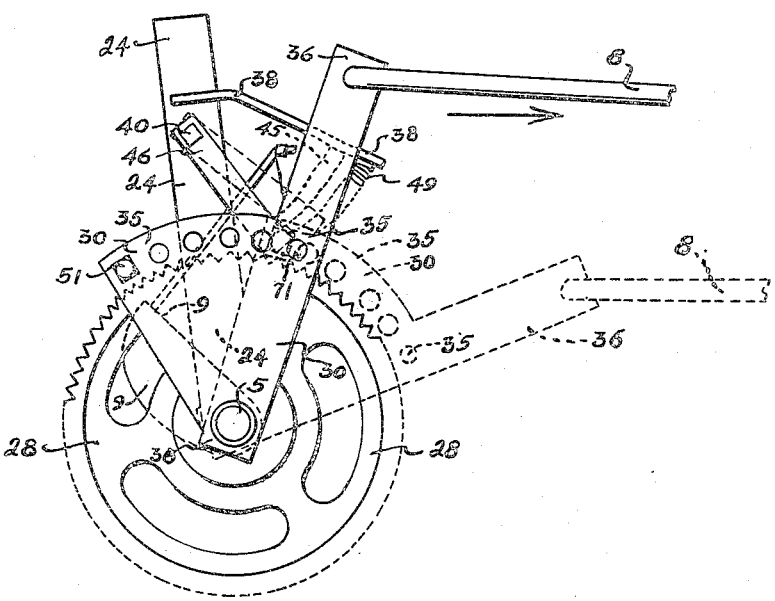
Figure 4 is a top view, showing a part of the mechanism as it appears in its normal or inactive position, the dotted lines indicating the first movement of the control arm when the bale tying mechanism is placed in operation.
Figure 5:
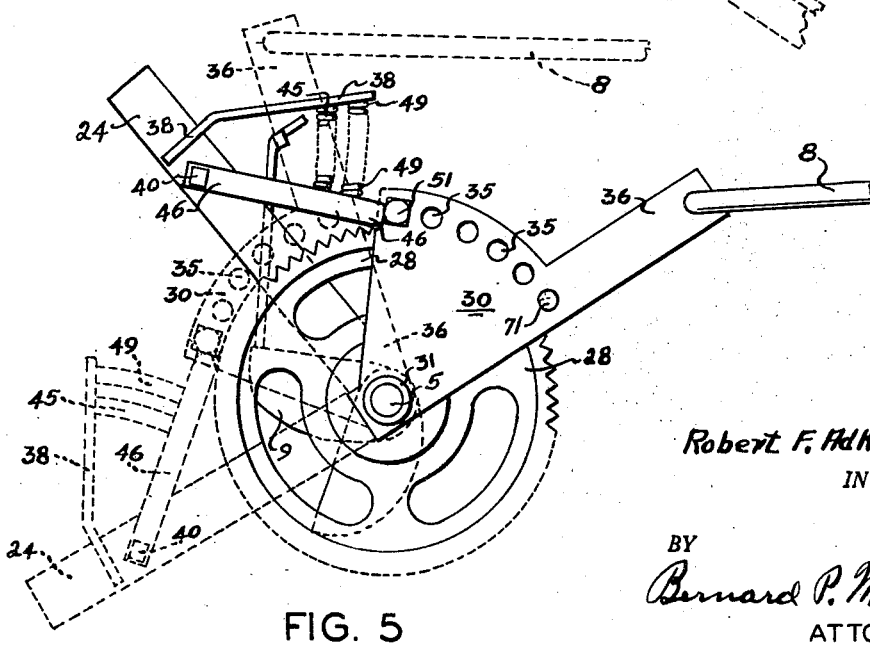
Figure 5 is a similar view showing the parts of the mechanism as they appear when the control arm is in the dotted line position of Fig. 4, the dotted lines of Fig. 5 illustrating the return of the parts to normal position.
Figure 3:
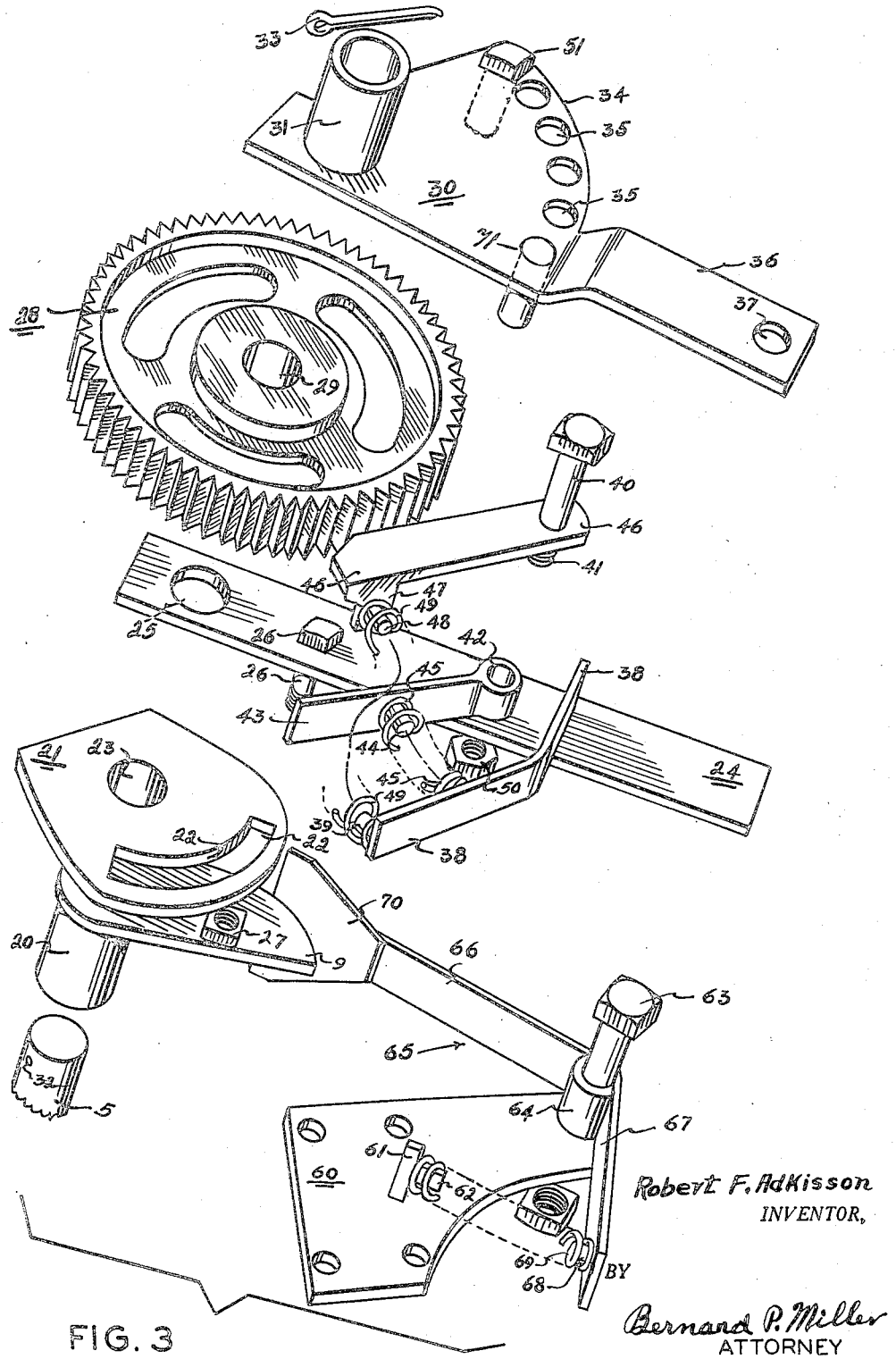
Figure 3 is an exploded perspective view showing the parts in slightly spaced relation, and illustrating the manner in which they are assembled together.

Referring now more particularly to Figs. 3, 4 and 5, the reference numeral 20 indicates a tubate sleeve which forms a part of one end of the arcuate arm 9. The sleeve 20 is adapted to be installed upon the shaft 5 directly above the metering wheel 4, and is rotatable upon the shaft 5.

Directly above the arcuate arm 9, and rigidly attached to the cam arm 9, is a flat plate 21 which extends horizontally outward from the shaft, and which has an arcuate slot 22 adjacent its outer edge. The plate 21 has an integral tubate sleeve portion 23 which surrounds the shaft 5, and which acts to space the plate 21 vertically from the arm 9. Both sleeves 20 and 23 are rotatable upon the shaft 5.

Directly above the plate 21, there is provided an elongated strap metal arm 24 which has a perforation 25 adjacent one end for receiving the shaft 5, and which is again perforated to receive a bolt 26. The bolt 26 is so located in the arm 24 that it projects downwardly through the slot 22 in the plate 21. The arm 24 may be pivotally adjusted on the shaft 5, and when so adjustably moved, the bolt 26 is adapted to move in the slot 22. A suitable nut 27 is adapted to engage the lower threaded end of the bolt 26, and when tightened, is adapted to clamp the arm 24 against the plate 21 to rigidly hold the two together for unitary rotation on the shaft 5.

Keyed to the shaft 5 above the arm 24, is a toothed gear 28 having an axial bore 29 for receiving the shaft.

Rotatably mounted on the shaft 5, and located directly above the gear 28, is a flat outwardly projecting plate 30. The plate 30 has an integral upstanding tubate sleeve 31 which acts as a bearing for preventing tilting movement of the plate with relation to the shaft.

The upper end of the shaft is provided with a transverse bore hole or perforation 32 for receiving a suitable cotter-pin 33, which holds the sleeve 31 on the shaft. The plate 30 has an arcuate peripheral edge 34, adjacent which is provided a row of through perforations 35, and projecting beyond said edge 34 is an arm 36 having a through perforation 37 in its outer end. The perforation is for the purpose of pivotally engaging the rear end of the link 8.

Referring again to the arm 24 below the gear 28, a ratchet mechanism is carried by the arm for co-acting with the teeth of the gear. This ratchet mechanism includes a rigid plate 38 which stands on edge, and which is weld-integrated to the arm 24 at a point remote from the bolt 26. The plate 38 projects laterally beyond the side edge of the arm 24, and its projecting end is bent slightly toward the gear 28, and is provided with a cylindrical lug 39. Between the plate 38 and the bolt 26, the arm 24 is perforated to receive a pivot pin 40 having threads 41 on its lower end. Riding upon the upper surface of the arm 24, and surrounding the pin 40, is a tubular sleeve 42 forming one end of a pawl 43. The sleeve 42 is pivoted on the pin 40 so that the free end of the pawl 43 may swing toward and away from engagement with the teeth of the gear 28. The outer face of the pawl 43 has a cylindrical lug 44 projecting therefrom, and a helical spring 45 has one of its ends engaged about the lug 44. The other end of the spring 45 similarly engages a lug, not shown, but which is integral with the adjacent face of the plate 38.

Directly above the pawl 43, and also pivoted on the pin 40, is a flat arm 46. The arm 46 is longer than the pawl 43 and rides on the upper edge of the pawl. That portion of the arm 46 which juts past the free end of the pawl, has an integral depending extension 47 which is provided on its outer face with a cylindrical lug 48. A helical spring 49 extends between the outer face of extension 47 and the inner face of the plate 38, the two ends of said spring being engaged over the two lugs 39 and 48. The arm 46 is adapted to pivotally swing with the pawl 43 on the pin 40, toward and away from the gear 28, but the arm 46 is not shaped to engage between the teeth of the gear, such as is done by the end of the pawl 43. The spring 49, however, is adapted to resiliently urge the free end of the arm 46 into flat engagement with the crests of the gear teeth. A nut 50 is provided for engaging the threads 41 on the pivot pin 40 so as to hold the arm 46 and pawl 43 assembled on the arm 24. Operation and office of the arm 46, pawl 43 and gear 28 will be more fully described hereinbelow. The pawl 43 and the arm 46 act substantially in unison, and together might well be referred to as the pawl mechanism of the device.

Figure 6:
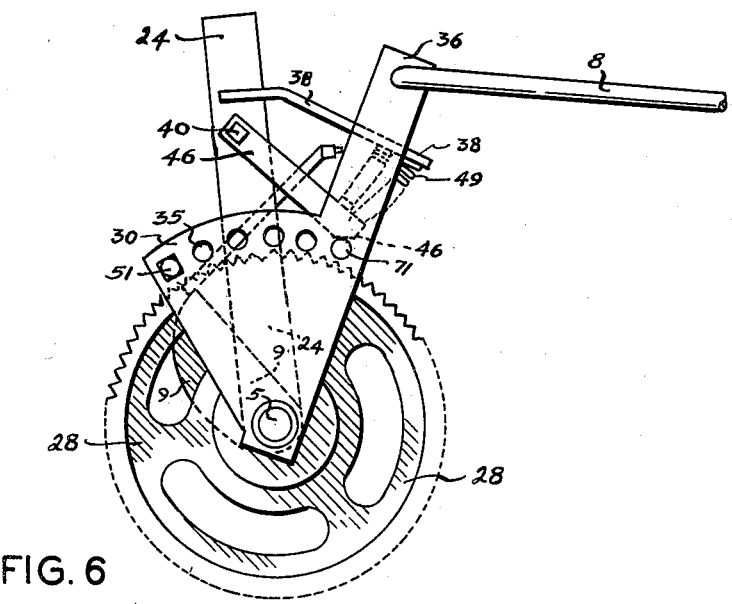
Figure 6 is a view similar to that of Fig. 4, and illustrating the declutching operation; and, Figure 7 is a similar view showing the declutching pin as it has barely passed the pawl.

As best illustrated in Figs. 3, 4 and 5, a depending pin 71 is permanently and rigidly installed in the right hand one of the perforations 35 in the plate 30. The perforations 35 are so located that the pin 71 sweeps in an arc just clear of the crests of the teeth on the gear 28 when the plate 30 is pivotally swung on the shaft 5. Should the plate 30 be swung sufficiently in a clock-wise direction, the depending pin 71 will pass between the gear 28 and the free ends of the arm 46 and pawl 43, urging them both out of contact with the gear. The springs 49 and 45 permit this outward movement of the arm 46 and the pawl 43, but are adapted to return the arm and pawl to their normal gear engaging positions, as soon as the pin 71 has passed. Figure 6 of the drawings shows the pin 71 in the position to disengage the arm 46 and pawl 43 from the teeth of the gear 28, and in Fig. 7, the pin is shown as it appears just after passing the free ends of the arm and pawl.

Figure 7:
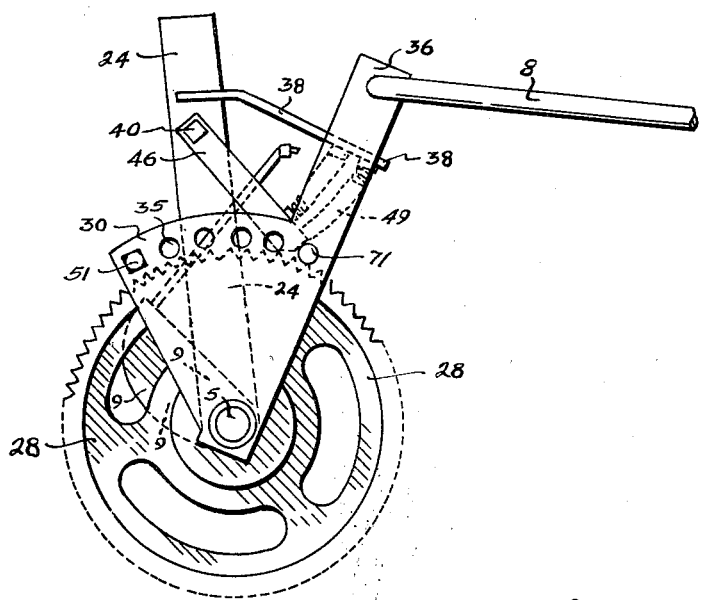

When the arm 36 is in the position shown in Fig. 7, if the arm is moved in a left hand or counter-clockwise direction, the pin 71 will abut the end of the arm 46 and will cause a similar counter-clockwise movement of the arm 24, plate 21 and the cam 9. During this counter-clockwise movement, the arm 46 and pawl 43 will ride along or over the teeth of the gear 28, even though the gear might at that time also be slowly rotating in a counter-clockwise direction. The distance to which the cam 9 is moved in said counter-clockwise direction depends upon the distance the arm 36 is similarly moved.

A bolt or pin 51 may be removably dropped into any one of the holes 35 of the plate 30 so as to alter the distance the plate 30 and the pin 51 are capable of moving the arm 46, pawl 43, arm 24, plate 21 and the cam 9 in said left hand or counter-clockwise direction. In Figs. 3, 4, 5, 6 and 7, this pin 51 is shown as being located in the left hand end one of the perforations 35. Consequently, the initial right hand movement of the arm 36 by the link 8 will cause the removable pin 71 to pass between the teeth of the gear 28 and the free ends of the arm 46 and the pawl 43, and to reach the point shown in Fig. 5.

In Fig. 4 of the drawings, the plate 30, its integral arm 36, and the link 8 are shown in solid lines, as they appear when at rest between operational cycles. This position of normal repose is also shown in Fig. 2, with the arm 24 being depicted as it appears when in re-set position, as is more fully described hereinbelow.

During one complete operation of the bale tying mechanism 3, the arm 36 and plate 30 are first moved toward the right hand, and reach the end of their right hand stroke in the dotted line position of Fig. 4, which is also the solid line position of Fig. 5. After reaching the right hand end of their stroke, the arm 36 and plate 30 are forced by the tying mechanism to move in a left hand direction to the dotted line position of Fig. 5. Thereafter, the tying mechanism returns the arm 36 and plate 30 in a right hand direction to their original position of repose. The arm 36 and plate 30 remain in this position until again moved by the bale tying mechanism.

The above described right and left hand movements of the plate 30 and its arm 36 are occasioned by movement of the above described link 8 of the bale tying apparatus.

Figure 2:
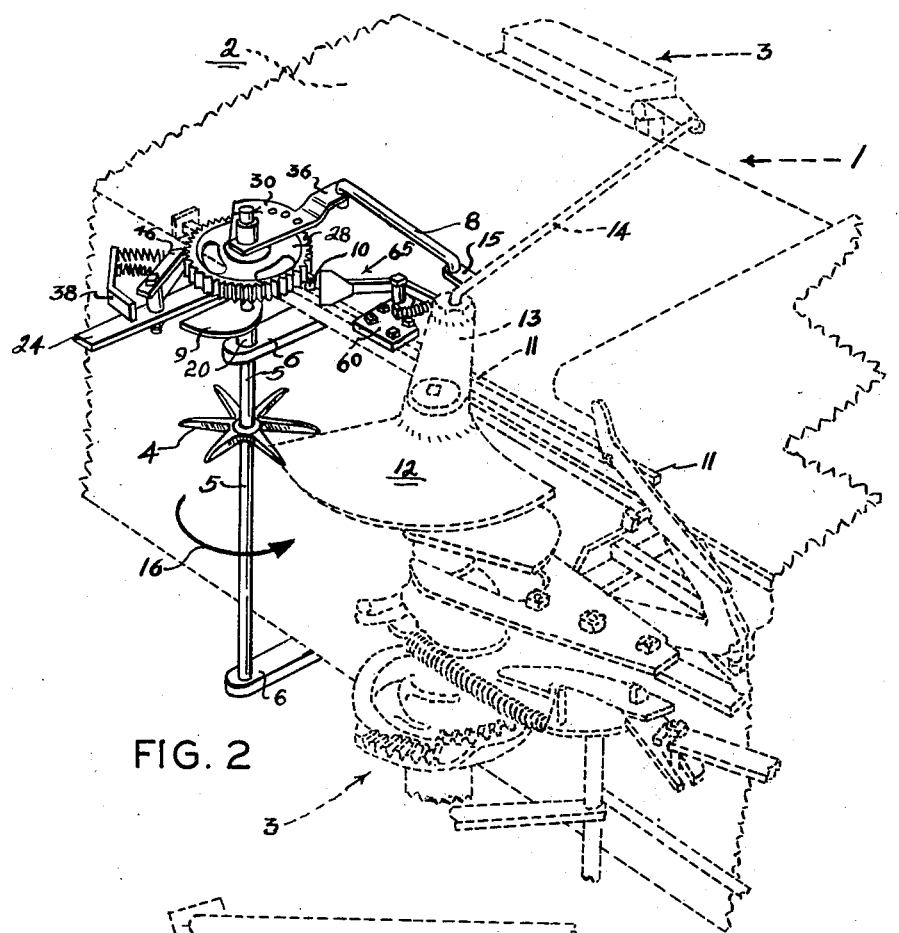
Figure 2 is an enlarged fragmentary view of the same, and showing the mechanism of the present invention in place.

As best shown in Fig. 2, the bale tying apparatus 3 includes a pivotally mounted arcuate cam 12 having an oppositely projecting arm portion 13 integral therewith. The outer end of the arm 13 is pivotally connected to a link or rod 14 which extends horizontally across the bale-box 2 to another part of the bale tying apparatus 3. The link 8 has its right hand end pivotally engaged in an ear 15 on the rod 14, and the left hand end of the link 8 is pivotally connected to the outer end of the arm 36 of the plate 30. Consequently, when the cam 12 is rotated, the link 8 travels with the arm 13 and therefore acts to similarly move the arm 36 to swing the plate 30.

During one complete tying operation of the apparatus 3, the cam arm 13, during its clockwise rotation, is first swung toward the right hand from the position shown in Fig. 2, and during this right hand movement, the cam arm 13 draws the arm 36 and plate 30 from their normal position of repose to the right hand end of their stroke as is shown in the dotted lines of Fig. 4, and also in the solid lines of Fig. 5. As the cam arm 13 continues in its rotative path, and as its approaches the shaft 5, the arm 36 and plate 30 are moved in a left hand direction to reach the left hand end of their stroke in the dotted line position of Fig. 5. As the cam arm 13 continues in its rotation, it is again swung toward the right hand to its position of repose, as shown in Fig. 2. This latter right hand movement of the cam arm 13 draws the arm 36 and plate 30 to their original position of repose as depicted in Fig. 2.

With the arm 24 and cam 9 located in the positions illustrated in Fig. 2, and with the cam 12, arm 13, and link 8 in the positions shown, the plate 30 and its arm 36 are also positioned as shown with relation to the arm 24. The end of the pawl 43 is in engagement between the teeth of the gear 28, and consequently the entire apparatus is in position to begin an operational cycle.

As hay is packed or compressed in the front, or right hand end of the bale box 2, it is forced to travel toward the rear end of the bale-box, or toward the left hand of Fig. 2. The star-gear or metering wheel 4, the teeth of which project into the bale-box and into contact with the rearwardly moving compressed hay, is driven by the hay to rotate in a counter-clockwise direction, as indicated by the arrow 16 of Fig. 2. Rotation of the metering wheel 4 causes similar counter-clockwise rotation of the shaft 5, and due to the engagement of the pawl 43 with teeth of the gear 28, causes a similar counter-clockwise swinging movement of the arm 24, plate 21, and consequently of the arcuate cam 9. When the cam 9 reaches the lug 10 on the trigger rod 11, the trigger rod is moved longitudinally thereby in a left hand direction, so as to trip the control mechanism, not shown, of the bale tying apparatus. The bale tying apparatus 3 thereupon starts its operation.

At the time the cam 9 trips the trigger lug 10 of the bale tying mechanism and consequently starts an operational cycle thereof, the arm 24 with its supported pawl mechanism (46—43), lies substantially in the solid line position of Fig. 4.

The first right hand movement of the cam arm 13 draws the arm 36 toward and then past the then stationary arm 24, to and slightly beyond the dotted line position of Fig. 4. The arm 36 never makes a complete revolution about the shaft 5.

It may be seen that as the plate 30 makes its right hand stroke in reaching the dotted line position of Fig. 4, the removable pin 51 carried by the plate 30 will be moved around the periphery of the gear 28 a sufficient distance to pass between the gear teeth and the pawl 43, and will reach a position beyond and to the right hand of the free end of the pivoted arm 46. This location of the pin 51 is illustrated in solid lines in Fig. 5.

With the pin 51 engaged against the free right hand end of the pivoted arm 46, any left hand movement of the arm 36 and plate 30 must, of course, move the arm 46 and the element 24 in a similar direction. This left hand movement of the arm 24 takes place when the arm 13 of the cam 12 passes one hundred eighty degrees of its travel, and continues to make a complete circle. The result of this return or left hand stroke of the arm 36 is to carry the arm or element 24 to the dotted line position of Fig. 5. When the arm 24 is thus moved in this left hand direction, it consequently carries the pawl 43 and the plate 21 along, with the pawl riding over the crests of the teeth of the gear 28. Since the cam arm 9 is fixed to the plate 21, it also is swung in a left hand direction to the position in which it is illustrated in Fig. 2.

The dotted lines of Fig. 5, and the solid lines of Fig. 2, show the element 24 and its supported arm 46 in its re-set position. As the arm 13 of the cam 12 completes one revolution, the arm 24 is moved in a right hand direction to its re-set position, as illustrated in solid lines in Fig. 4.

It is pointed out, that should the pin 51 be positioned in any but the extreme left hand one of the perforations 35 in the plate 30, the arm 24, and consequently the cam arm 9, will be moved a lesser distance during the left hand or setting stroke. If the cam arm 9 is thus moved toward the left hand a lesser distance in being re-set, then it will have a greater distance to travel before reaching the lug 10 on the trigger rod 11. Consequently, more compressed hay will pass rearwardly through the bale-box before each operation of the bale tying apparatus. The result is the tying of longer bales of compressed hay. The pin 51 may, of course, be positioned in any desired one of the perforations 35.

When it is desired to make the longest bale possible, the pin 51 is removed altogether, and then the permanent pin 71 acts to abut the end of the pawl mechanism (46—43), and to thrust the arm 24 toward the left hand to its set position.

It has been found in actual operation that there is a tendency for the trigger rod 11, which is spring loaded, to kick the cam 9 back in a right hand direction after the trigger has been tripped, and before the arm 13 of the cam 12 makes its left hand movement. This is due to the fact that during the bale tying operation, there is no rearward movement of hay in the bale-box 2, and consequently counter-clockwise rotation of the metering wheel 4 has temporarily ceased. In order to prevent this kick-back of the cam 9 until after the cam has been fully moved past the lug 10, the following described mechanism has been provided.

A flat base plate 60 is firmly bolted to the top of the bale-box 2 over but not in contact with the trigger rod 11. The plate 60 has an upstanding centrally located lug or post 61 with an integral lateral projection 62 carried thereby. The plate 60 is perforated to receive a vertical pivot pin or bolt 63 which passes through a sleeve portion 64 of a strap spring 65. The spring 65 is substantially L-shaped in general configuration, with the sleeve 64 occurring at the junction of its two leg portions 66 and 67. The left hand face of the right hand leg portion 67 of the spring 65 has a cylindrical horizontally projecting lug 68, and a helical compression spring 69 has its ends engaged over the projection 62 and the lug 68.

The left hand leg portion 66 of the spring 65 has a flat shoe 70 which lies in the path of the cam arm 9, and which the cam arm must pass in reaching the lug 10 of the trigger rod 11. When the cam 9 has once passed the shoe 70, the shoe then acts to prevent any kick-back or slight clockwise movement of the cam 9.

By providing the pin 71 so that it de-clutches the gear 24 and metering wheel 4 when the bale tying mechanism is in operation, bales of desired length are insured.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In hay baling equipment, the combination of: a bale box within which hay is compressed; apparatus for mechanically tying the compressed hay in bales, said apparatus including a movable lug carrying trigger rod adapted to be moved to start the operation of the tying apparatus; a rotatable shaft beside the bale-box; a metering wheel keyed to the shaft and adapted to be rotated by movement of the hay in the bale-box; a tripper arm carried by the shaft and adapted to move the trigger rod to starting position when the shaft and arm are rotated by the metering wheel; and adjustable means for selectively regulating the distance said arm must travel before it moves the trigger rod to starting position, said means including a gear keyed to said shaft; a pawl movable with said tripper arm and spring urged to engage said gear, whereby the gear may drive the tripper arm to swing in only one direction; a plate rotatably mounted on said shaft and swingably movable in two directions by said bale tying apparatus; a pin carried by said plate adjacent the periphery of said gear, said pin adapted to pass between the pawl and the gear to a point beyond the end of the pawl when the plate is swung in one direction, and adapted to engage the end of the pawl and move the tripper arm to a re-set position, when the plate is swung in the opposite direction; and means carried by the plate for holding the pin in various radial positions of adjustment, whereby the re-set position of the tripper arm may be varied.

2. Structure as specified in claim 1, wherein said plate includes a plurality of radially spaced perforations which constitute said pin holding means.

3. Structure as specified in claim 1, and means operated by the bale tying apparatus for re-setting said arm each time the apparatus performs one complete tying operation.

ROBERT F. ADKISSON.

REFERENCES CITED

The following references are of record in the file of this patent:

UNITED STATES PATENTS

| Number | Name | Date |
|---|---|---|
| 894,876 | Clark | Aug. 4, 1908 |
| 1,305,344 | Dudley | June 3, 1919 |

FOREIGN PATENTS

| Number | Country | Date |
|---|---|---|
| 214,080 | Germany | Oct. 6, 1909 |